C. G. COLLINS.
PROCESS FOR THE SEPARATION OF SULFUR FROM FURNACE GASES.
APPLICATION FILED NOV. 18, 1916.
1,314,634.
Patented Sept. 2, 1919.
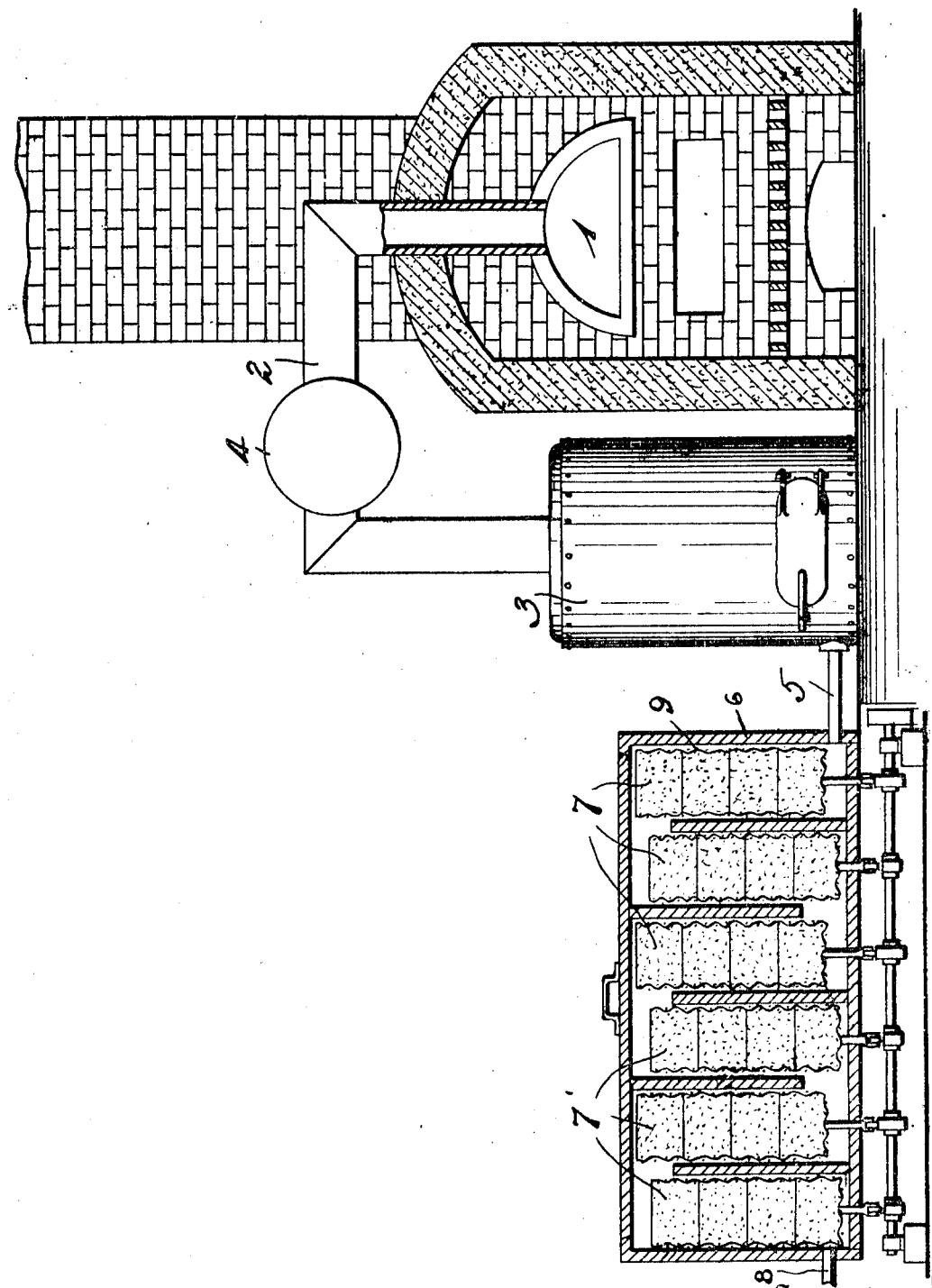
Inventor
Caleb G. Collins
By his Attorney
Wm Wallace White

UNITED STATES PATENT OFFICE.

CALEB GROZIER COLLINS, OF KELLYS FORD, VIRGINIA, ASSIGNOR TO C. AMORY STEVENS, OF NEW YORK, N. Y.

PROCESS FOR THE SEPARATION OF SULFUR FROM FURNACE-GASES.

1,314,634. Specification of Letters Patent. Patented Sept. 2, 1919.

Application filed November 18, 1916. Serial No. 132,016.

*To all whom it may concern:*

Be it known that I, CALEB G. COLLINS, a citizen of the United States, residing at Kellys Ford, in the county of Culpeper and State of Virginia, have invented certain new and useful Improvements in Processes for the Separation of Sulfur from Furnace-Gases, of which the following is a specification, reference being had therein to the accompanying drawing.

This invention relates primarily to a process for the separation of elementary sulfur from fumes and smelter gases resulting from the roasting or smelting of sulfur-bearing ores.

The present application is a continuation in part of application Serial No. 805,029.

Heretofore, sulfur has been separated from fumes by the use of water or moisture, so the product has been moist and thus hard to handle and requiring drying before being in a marketable condition.

According to my invention the sulfur is obtained in a dry state through condensation in a peculiar manner.

In the accompanying drawing a form of apparatus in which the process can be carried out is shown in side elevation, partly in section.

Referring to the drawing, the numeral 1 designates a furnace or retort of suitable construction within which the roasting or smelting of the sulfur-containing material takes place. A pipe 2 leads from the furnace to the top of a cooling and storage tank 3. In order to facilitate the progress of the gases to the cooling tank, the conducting pipe 2 is constructed comparatively large in diameter and a fan 4 is provided in this pipe connection. This fan is capable of being controlled in speed of rotation, so that the rate of flow of the gases may be regulated with precision. It is to be understood that the fan can be replaced by any other device for accomplishing the desired purpose, without departing from the spirit of the invention.

A smaller pipe 5 leads from the bottom of the cooling tank to one end of an elongated deposition chamber 6, in which a series of filter elements are located.

The filter elements 7 nearest to the inlet end of the chamber embody in their construction asbestos as the filtering and collecting material so as not to be affected by the heat of the incoming gases, whereas the elements 7 more remote from this end have excelsior as the filter material. Of course, it is possible that other kinds of material may give better results or be more conveniently used under the prevailing conditions in practice. The filter elements 7 and 7' are removably held in receptacles 9, which latter are adapted to be reciprocated to remove the sulfur collected thereon, by means of the mechanism shown. It is thought unnecessary to describe this mechanism in detail, as it does not constitute any part of the present invention and has been clearly shown and described in my Patent No. 1148501.

The desulfureted gases leave the chamber 6 through a discharge pipe 8 at the end opposite to the inlet, which may be termed the "outlet end."

The temperature of the furnace 1 should be kept at from 700° C. to 925° C. This is really the widest permissible range of temperature. It should be confined when practicable to even narrower limits, such as from 800° C. to 850° C.

The dimensions of the cooling tank 3 must be such that a sufficient volume of the hot gases will accumulate therein, before passage through pipe 5 to the deposition chamber, to permit of rapid cooling to a temperature which is slightly above the condensation point of sulfur. As a result, when the gases enter the deposition chamber the temperature will fall to the condensation point and the sulfur will settle on the filter material as a dry product capable of being readily removed. The condensation will be complete, too, which would not be the case if the gases were permitted to enter the chamber while very hot. If such were the case, the filter material and the whole interior of the chamber would become hotter and hotter, advancing from the inlet end to the outlet end, until soon there would be uncondensed sulfur leaving through the outlet.

In short, the process consists in rushing the furnace gases to a point located as near to the furnace as is consistent with effective cooling; then cooling the gases to a temperature which is above the condensation point of sulfur; and then leading the gases to the deposition chamber and reducing the temperature further until the condensation point is reached while the gases are in contact with collecting material.

In practice, efficient working of the process is reached and maintained by controlling the speed of the gases as they pass from the source to the cooling tank, this being effected through the agency of the fan 4. This must be carefully done, because if the speed is too slow, condensation may occur in the cooling chamber, particularly when the apparatus is started. If the speed is too great, the condensation in the deposition chamber may be incomplete. This latter condition may be detected by testing the gases at the outlet 8.

It is to be noted that no cooling medium is employed other than the ambient atmosphere. The tank 3 and the chamber 6 will be initially at the temperature of the atmosphere, which will always be far below the condensation point of sulfur (approximately 440° C.).

However, as the hot gases are allowed to pass into the said tank and then through the deposition chamber, the temperature in the bottom part of the tank may be brought to about 500° C., at which it is maintained by careful regulation of the speed of supply.

While I have described my invention as being applied to the recovery of sulfur primarily, it is to be understood that I contemplate its use in the separation of analogous chemical elements or substances from gases in which they are contained.

Having described the invention, what I desire to claim and to secure by Letters Patent is:

The process for the separation of elementary sulfur from furnace gases which consists in first cooling the gases while in a dry state to a temperature slightly above the condensation point of the sulfur, and then reducing the temperature further in a dry state until the condensation point is reached while the gases are in contact with collecting material.

In testimony whereof I have hereunto affixed my signature.

CALEB GROZIER COLLINS.